F. S. BISHOP & H. L. COLE.
NUT SEPARATOR.
APPLICATION FILED DEC. 6, 1915.

1,233,965. Patented July 17, 1917.

Inventors.
Fern S. Bishop
Homer L. Cole
By Edmund P. Stargel
Atty.

UNITED STATES PATENT OFFICE.

FERN S. BISHOP AND HOMER L. COLE, OF SANTA ANA, CALIFORNIA.

NUT-SEPARATOR.

1,233,965.

Specification of Letters Patent.

Patented July 17, 1917.

Application filed December 6, 1915. Serial No. 65,270.

*To all whom it may concern:*

Be it known that we, FERN S. BISHOP and HOMER L. COLE, both citizens of the United States, residing at Santa Ana, in the county of Orange, State of California, have invented new and useful Improvements in Nut-Separators, of which the following is a specification.

This invention relates to a nut separator, and pertains particularly to a machine which will separate blank nuts from those nuts containing sound kernels. Among nuts which come from the orchard commonly known as "orchard run" are some containing shriveled, dry or small kernels, and known as blanks. It is desirable to separate the blanks from the sound nuts before placing the nuts on the market. This has been partially accomplished by machines employing an unconfined blast of air.

The novel features of our invention comprise the provision of means for passing the orchard run of nuts beneath the conduit through which an air blast is so directed and of such intensity that the blanks will be carried along said conduit while the sound nuts will not enter therein.

We accomplish these objects by the embodiment of our invention illustrated in the accompanying drawing, in which.

Figure 1:
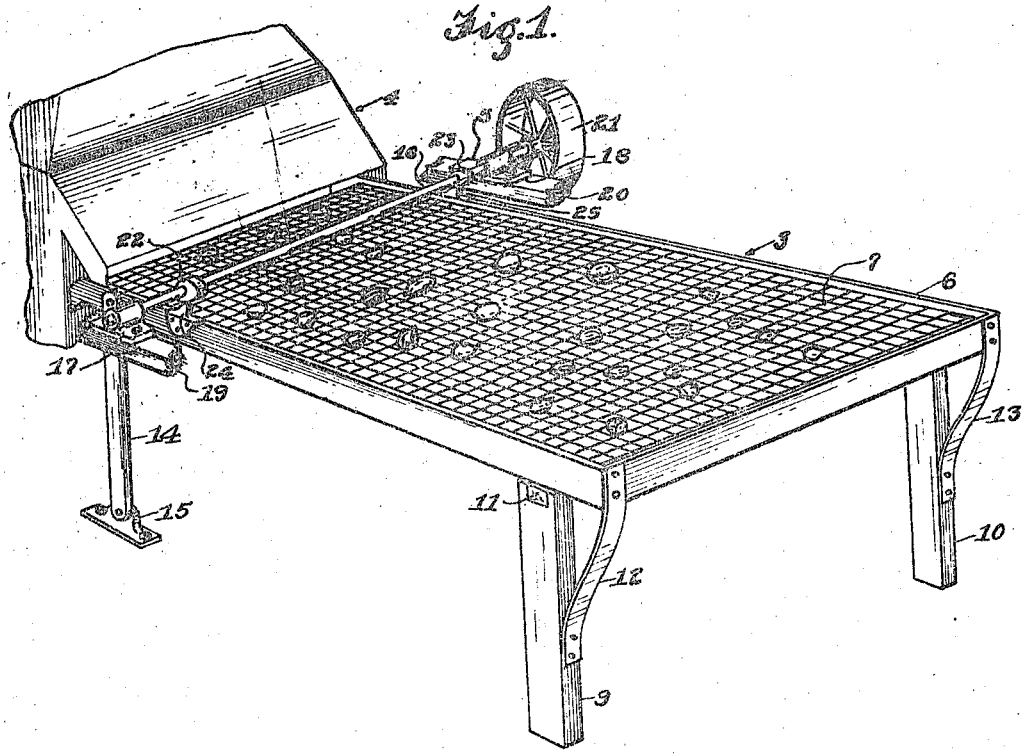
Figure 1 is a perspective view of a preferred form of our machine.
Figure 2:
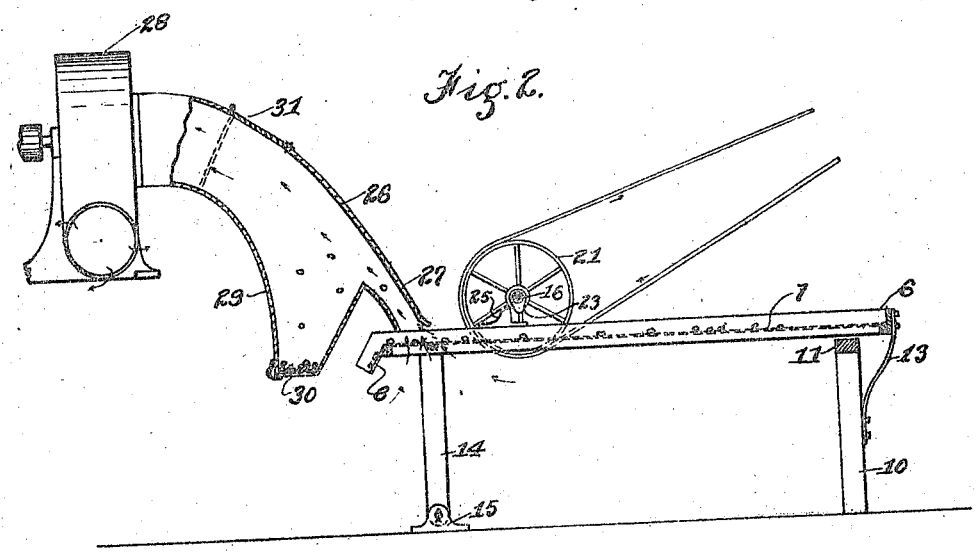
Fig. 2 is a vertical sectional view with the fan blower shown in elevation.

Referring more particularly to the drawing, 3 indicates a shaker table upon which the nuts are disposed for separation of dirt, broken shells and foreign material; the nuts traveling forward along the table to the separating mechanism 4. The shaker mechanism for operating the table is indicated generally at 5.

Shaker table 3 comprises a frame work 6 preferably of rectangular form and having a screen bottom 7 of sufficient mesh to permit dirt and foreign material to pass through. The end of the table is provided with an apron 8 over which the nuts pass, as they leave the table, and beneath which may be placed any suitable receptacle. Table 3 is supported at one end upon legs 9 and 10 which are connected by a cross piece 11. Secured to legs 9 and 10 are leaf springs 12 and 13. The upper end of the latter are secured to the frame 6 supporting it a slight distance above the cross piece 11 so that it may have a reciprocating motion with respect thereto. The opposite end of the table is supported by links 14 pivotally secured to the sides of the frame 6, and to brackets 15 upon the floor.

The shaking mechanism 5 comprises a shaft 16 supported in suitable bearings 17 and 18 disposed upon a framework at the sides of the table indicated by 19 and 20, but not shown in detail. Fixedly secured to the shaft 16 is a pulley wheel 21 adapted to receive a belt from which power is taken to rotate the shaft 16. Fixedly secured to shaft 16 are cams 22 and 23 which engage cam followers 24 and 25, the latter being fixedly secured to the shaker frame. Upon rotation of the shaft 16 the cams 22 and 23 engaging the followers 23 and 24 cause the shaker to move gently to the left. The raised portion of the cam then disengages the followers and springs 12 and 13 snap the shaker table to the right. The nuts are moved toward the left by the gentle movement of the shaker table but due to their inertia the return movement to the right causes them to slide with respect to the table to the left.

Disposed adjacent the apron 8 is a conduit 26 of such form that its mouth extends the width of the table. The throat 27 of the conduit is of such length that nuts may pass therethrough. The mouth of the conduit 26 is spaced from the floor 7 of the table. A fan blower 28 is disposed with its inlet connected to the conduit 26, the latter being of larger cross sectional area than the throat. Adjacent the inlet of the fan blower at the throat 27 a pocket 29 is disposed in the conduit 26 and serves as a receptacle for the blanks which as they move through the throat 27 and into the enlarged portion of the conduit, fall downward because of the decreased intensity of the blast at the enlarged portion of the conduit. A door 30 may be provided in the bottom of the pocket for emptying the pocket of the accumulated blanks.

It will be noted that the blast of air is occasioned by the suction of the fan blower in the embodiment of our invention shown herein. The suction pressure may be regulated by means of a door 31, the latter acting as a valve to by-pass air from the outside, the amount of opening regulating the blast of air through the throat 27.

In the operation of the separator, nuts are placed on the shaker table 3 at the right hand end and move forward to the left hand end due to the shaking of the table. Any foreign material will fall through the meshes of the screen 7. As the nuts pass under the mouth of the conduit 26 the blast of air created causes the blanks which are lighter in weight than the sound nuts to pass upward through the throat 27 and to be deposited in the pocket 29, sound nuts passing over the apron 8. It is obvious that instead of using suction pressure, a blast of air may be forced from below the table and into the conduit 27. Our device may also be used for the separation of materials of a character similar to nuts, such as cranberries.

What we claim is:

A nut separator, comprising in combination a reciprocable horizontally disposed table for the passage of nuts or like substances thereover and provided with apertures for the passage of air therethrough, means for imparting to said table a slow movement in one direction and a quick return movement, thereby causing the nuts to progress by steps across said table with intervals of rest relative to the table, a conduit with its mouth disposed over said apertures at the end toward which the nuts are moved and spaced from said table to permit the passage of nuts thereunder, and means for creating an air blast into said conduit.

In witness that we claim the foregoing we have hereunto subscribed our names this 15th day of October, 1915.

FERN S. BISHOP.
HOMER L. COLE.